(12) United States Patent
Mengel

(10) Patent No.: US 7,207,757 B2
(45) Date of Patent: *Apr. 24, 2007

(54) PANEL FASTENER

(76) Inventor: Craig Mengel, 902 E. 7th St., Lamar, MO (US) 64759

( * ) Notice: Subject to any disclaimer, the term of this patent is extended or adjusted under 35 U.S.C. 154(b) by 207 days.

This patent is subject to a terminal disclaimer.

(21) Appl. No.: 10/324,379

(22) PCT Filed: Jun. 19, 2001

(86) PCT No.: PCT/US01/19474

§ 371 (c)(1),
(2), (4) Date: Dec. 19, 2002

(87) PCT Pub. No.: WO01/98596

PCT Pub. Date: Dec. 27, 2001

(65) Prior Publication Data

US 2003/0223840 A1    Dec. 4, 2003

Related U.S. Application Data

(63) Continuation-in-part of application No. 09/598,277, filed on Jun. 22, 2000, now Pat. No. 6,299,397.

(51) Int. Cl.
   *F16B 13/04*   (2006.01)
   *F16B 13/06*   (2006.01)

(52) U.S. Cl. ............... 411/24; 411/33; 411/54; 411/60.1; 411/25

(58) Field of Classification Search .......... 411/24, 411/25, 26, 32, 33, 54, 60.1, 354, 79, 80
See application file for complete search history.

(56) References Cited

U.S. PATENT DOCUMENTS

| 2,937,666 | A |   | 5/1960  | Meisch |        |
|-----------|---|---|---------|--------|--------|
| 3,042,094 | A |   | 7/1962  | Liljeberg |     |
| 3,202,034 | A | * | 8/1965  | Korenchan | 411/24 |
| 3,438,659 | A |   | 4/1969  | Weldron |       |
| 3,494,481 | A |   | 2/1970  | Smith  |        |
| 3,911,782 | A |   | 10/1975 | Liebig |        |
| 3,954,345 | A | * | 5/1976  | Morris | 403/297 |

(Continued)

FOREIGN PATENT DOCUMENTS

EP    0949424 A2    10/1999

(Continued)

*Primary Examiner*—Katherine Mitchell
(74) *Attorney, Agent, or Firm*—Adams Evans P.A.

(57) ABSTRACT

An elongate fastener is provided for securing a pair of panels together wherein the panels includes respective bores therein. Each end of the fastener includes an expansible end portion thereon which is arranged to be received within the respective bore. A wedge member is mounted within each expansible end portion for longitudinal sliding movement between a disengaged position and an engaged position wherein the expansible end portions are expanded relative to the disengaged position. An actuator is located centrally between the expansible end portions for pivotal movement about an actuator axis which lies perpendicularly to a longitudinal axis of the fastener. The fastener permits a pair of panels to be mounted with one end of one panel abutted against the other panel wherein the actuator is accessible from a recessed installation aperture on an inner face of one of the panels. The resulting joint is secure while being hidden from view using a one-piece fastener.

16 Claims, 14 Drawing Sheets

U.S. PATENT DOCUMENTS

| | | | |
|---|---|---|---|
| 4,093,389 A | * | 6/1978 | Wibrow ...................... 403/280 |
| 4,786,225 A | * | 11/1988 | Poe et al. ...................... 411/32 |
| 5,169,269 A | * | 12/1992 | Tatematsu et al. ............ 411/24 |
| 5,314,278 A | | 5/1994 | Weber |
| 5,562,375 A | | 10/1996 | Jackson |
| 5,664,900 A | | 9/1997 | Matthies |
| 5,741,083 A | | 4/1998 | Schvartz |

FOREIGN PATENT DOCUMENTS

| | | |
|---|---|---|
| TW | 86200609 | 1/1997 |

* cited by examiner

PANEL FASTENER

FIELD OF THE INVENTION

This application is a continuation-in-part application of U.S. application Ser. No. 09/598,277, filed on Jun. 22, 2000, which has matured to U.S. Pat. No. 6,299,397, granted on Oct. 9, 2001.

This invention relates to a fastener for fastening a pair of objects together. It has particular application to the coupling of panels, for example those used in furniture.

BACKGROUND

Various types of fasteners are used for assembly of furniture and the like wherein it is desirable to make use of a fastener which is strong yet simple and quick to use. This includes the commercial assembly of cabinets and the like as well as assembly of furniture at the factory by professionals. The ready to assemble (RTA) furniture industry is one particular example involving furniture which is sold to the customer in a disassembled form that makes use of appropriate fasteners such that the customer is able to assemble the furniture in their homes using conventional tools. Fasteners designed for this use are preferably easy to use by the general public, while being secure and well hidden upon assembly of the RTA furniture.

An example of a fastener for RTA furniture is illustrated in European Application No. 0 949 424 to Hafele GmbH &CO. That application discloses a fastener for use in mounting a pair of panels together wherein the fastener includes a first expansible wedge member arranged to mount in a bore in one of the panels and a second expansible wedge member arranged to mount in a bore in the other panel. An actuator for the wedges is located at one end of the fastener such that the second wedge member is located centrally on the fastener and oriented such that upon assembly, an apex of the second wedge member is directed inwardly towards the panel securing the second wedge member therein. This occurs due to the location of the actuator at one end of the fastener which requires both wedges to be oriented in the same direction in order to make use of a common actuator. In this orientation, expansion of the second wedge member causes a wedging action to urge the fastener out of the panel instead of drawing the panels together. Furthermore, the first and second wedge members require different bore sizes in which to be received which results in added tooling and manufacturing costs when forming the panels.

SUMMARY

According to one aspect of the present invention there is provided a method of joining two objects with respective fastener receiving bores therein, the method comprising:

providing an elongate fastener assembly with opposite ends, the fastener assembly comprising first and second elongate fastener elements arranged side by side;

inserting the opposite ends of the fastener assembly into the respective bores; and displacing the first and second fastener elements relative to one another to expand the ends of the fastener assembly thereby griping the bores.

The movement of the two elements relative to one another thus causes the expansion of the ends of the fastener assembly for anchoring purposes.

According to another aspect of the present invention there is provided a fastener for securing together a pair of opposing objects having respective bores therein, the fastener comprising:

an elongate fastener assembly having first and second expansible portions at respective ends thereof for being slideably received within the respective bores;

first and second wedge members mounted adjacent the respective ends of the fastener assembly for engagement with the respective first and second expansible portions thereof, the wedge members and the respective expansible portions being mounted for sliding movement relative to one another in a longitudinal direction of the fastener assembly between a disengaged position and an engaged position wherein the wedge members are wedged within the respective expansible portions of the fastener assembly such that the expansible portions of the fastener assembly are expanded in a radial direction relative to the disengaged position; and an actuator mounted on the fastener assembly for rotation about an actuator axis extending transversely to the elongate fastener assembly at a location spaced between the wedge members, the actuator being coupled to the wedge members respectively for displacing the wedge members relative to the expansible portions between the engaged and disengaged positions as the actuator is rotated relative to the fastener assembly.

The expansible portions of the fastener assembly may be mounted for longitudinal sliding movement relative to one another and coupled to the actuator to be displaced towards one another in moving from the disengaged position to the engaged position.

The actuator may be a cam mounted for rotation about an actuator axis. Each wedge member may be associated with a cam follower for urging the wedge member into the engaged position as the cam is rotated.

The wedge members may fixed in relation to the fastener assembly and the expansible portions slideably mounted on the fastener assembly for movement towards each other as the expansible portions are displaced from the disengaged position to the engaged position. Alternatively, the expansible portions may be fixed in relation to the fastener assembly and the wedge members slideably mounted for movement away from each other as they are displaced from the disengaged position to the engaged position.

In one particularly advantageous embodiment, the fastener assembly has two elongate elements, each including respective ones of the expansible portions and the wedge members. The two elements are slideable relative to one another for displacing the wedge members relative to the respective expansible portions between the disengaged and the engaged positions.

In another embodiment, a flexible tension member is coupled between the two wedge members and the actuator is a rotatable spindle having an aperture through which the tension member is threaded so that rotation of the spindle causes the tension member to be wrapped about the spindle, drawing the wedge members longitudinally towards each other.

The fastener may include a lock for resisting reverse rotation of the spindle and unwinding of the tension member.

The wedge members may be substantially conical in shape, with an inner surface of each expansible portion having a mating conical surface.

According to another aspect of the present invention there is provided a fastener for securing together opposing objects having respective bores therein, the fastener comprising:

a pair of elongate members each having a wedge at a first end and an expansible portion at a second end thereof, the wedge of each member being located adjacent the expansible portion of other member, spaced longitudinally inward therefrom in a disengaged position, the elongate members being slideable relative to one another in a longitudinal direction of the members from the disengaged position to an engaged position wherein the wedge of each member is wedged within the expansible portion of the other member such that the expansible portions are expanded radially relative to the disengaged position; and stop means associated with each of the members for engaging the respective objects as the ends of the members are inserted into the respective bores, whereby on displacement of the objects towards one another, the objects engage the stop means to displace the expansible ends inwardly towards each other and into the engaged position thereof.

According to a further aspect of the present invention there is provided fastener for coupling two objects with respective fastener receiving bores therein, the fastener comprising an elongate fastener assembly with opposite ends for insertion into the respective bores in the two objects, the assembly including:

first and second elongate elements positioned side by side and relatively movable between a disengaged position and an engaged position in which the ends of the fastener assembly are expanded transversely to engage the respective bores; and a retainer for retaining the first and second elements in the engaged position.

The retainer is particularly useful in those embodiments where there is no actuator per se incorporated into the fastener, and the relative movement of the first and second elements of the fastener assembly is caused either by an external tool that does not form part of the fastener or by engagement of the fastener elements with objects to be joined as they are moved together. In one such embodiment the two elements are longitudinally tapered and slide over one another as wedges as they are longitudinally displaced relative to one another. This expands the lateral dimension of the fastener to engage the bores in the two objects being coupled.

In embodiments without an actuator, one of the elements may have a transverse through aperture and the other a cavity confronting the aperture. This allows a lever, for example a screwdriver to be inserted through the aperture to engage the cavity so that a prying action will move the two elements relative to one another.

The retainer may be one or more projections on one of the two elements and mating recesses in the other element, with the projections having inclined leading faces to serve as a kind of ratchet mechanism.

In other embodiments, the fastener includes an actuator that is used to separate the two elements transversely. This may be a screw threaded into one of the elements and engaging the other. In this case, the two elements move transversely relative to one another in movement between the disengaged and engaged position. The threaded actuator then serves as the retainer.

According to another aspect of the present invention there is provided a fastener for coupling two objects with respective fastener receiving bores therein, the fastener comprising an elongate fastener assembly with opposite ends for insertion into the respective bores in the two objects, the ends being transversely expandable to grip the respective bores and each end having teeth on the periphery thereof, wherein the teeth are helically oriented ribs.

The helical teeth allow the fastener to be screwed into the bores before expansion of the fastener assembly ends.

BRIEF DESCRIPTION OF THE DRAWINGS

In the accompanying drawings, which illustrate exemplary embodiments of the present invention.

DETAILED DESCRIPTION

Figure 1:
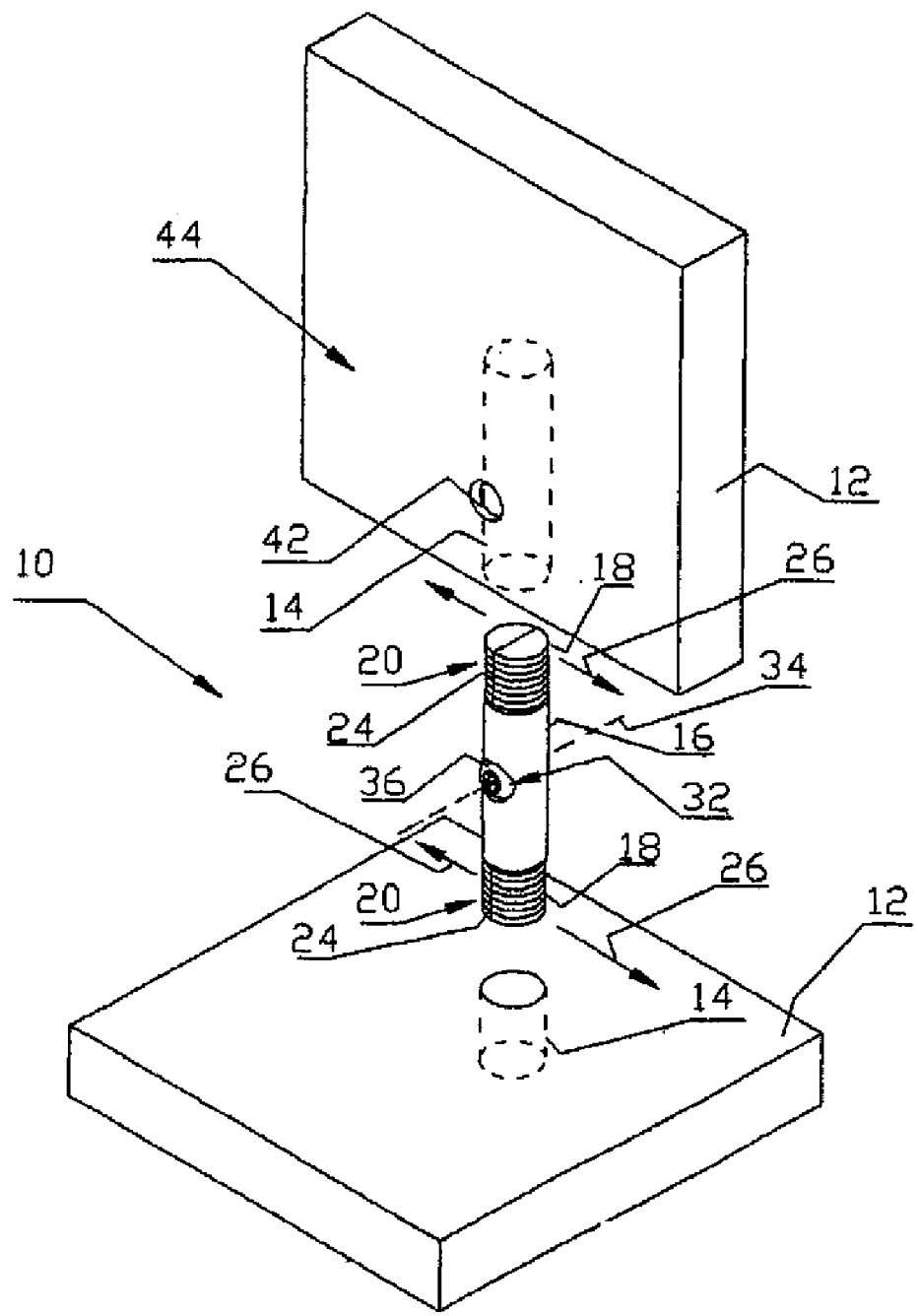
FIG. 1 is an isometric view of a first embodiment of the present invention shown as it would be installed between a pair of panels to be joined.

Referring to the accompanying drawings, there is illustrated a fastener generally indicated by reference numeral 10. The fastener is for use in joining a pair of opposing panels 12 each having a respective bore 14 therein. In the arrangement of FIG. 1, one of the panels shown is an edge bored panel while the opposing surface comprises a face bored panel wherein each bore is arranged to receive an end of the fastener therein for joining the panels. This is a typical arrangement when securing ready to assembly furniture and the like.

Figure 2:
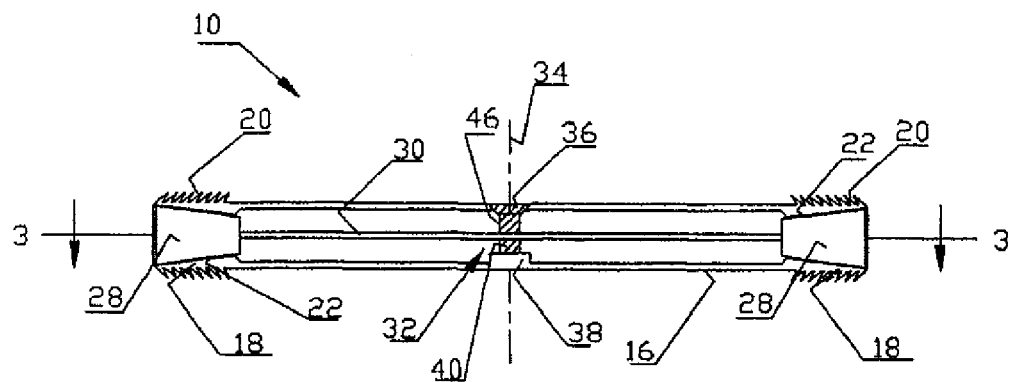
FIG. 2 is a sectional side view of the fastener of FIG. 1 in a disengaged position.
Figure 3:
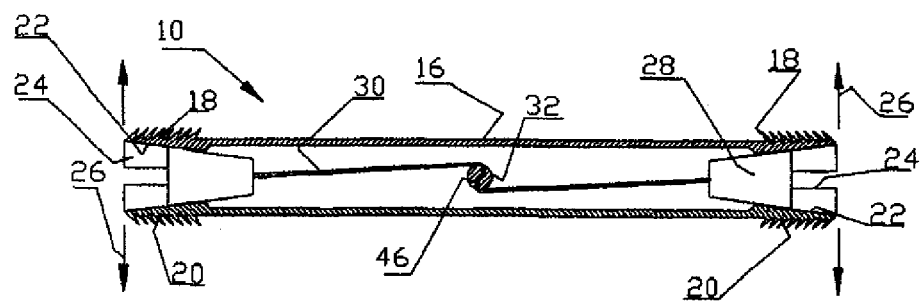
FIG. 3 is a sectional view along the line 3—3 of FIG. 2 in an engaged position.

In a first embodiment of the present invention as shown in FIGS. 1 through 3, the fastener 10 includes an elongate fastener assembly 16 having an expansible portion 18 located at each end of the fastener assembly. The expansible portions are generally cylindrical extensions of the fastener assembly having a gripping outer surface 20 for engaging within one of the bores 14 of the panels to be joined. The expansible portions are arranged to be expanded in a radial direction once installed in the respective bores to secure the fastener within the bore.

An inner face 22 of each expansible portion is generally conical in shape, with the inner face 22 of the expansible portions tapered inwards towards each other. Each expansible portion 18 includes at least one longitudinally extending expansion slot 24 to permit lateral expansion in a direction indicated by arrows 26.

A pair of wedge members 28 are mounted within the respective expansible portions 18 for sliding movement therein. Each wedge member 28 is frustoconical in shape, tapering inwardly towards each other for mating with the respective inner faces 22 of the expansible portions 18. As shown in the disengaged position of FIG. 2 the wedge members mate with the respective expansible portions with the expansible portions being in a relaxed position with a diameter substantially equal to that of the fastener assembly 16. As the wedge members are displaced inwardly as shown in the engaged position of FIG. 3, the members 28 act as wedges to expand the expansion slots 24 of the respective expansible portions 18 thus expanding the portions 18 in the direction of arrow 26.

A tension member 30 in the form of a flexible wire extends between the wedge members 28 and has the wedge members fastened to its opposite ends. In one embodiment the wedge member is hollow and has an aperture at its apex through which the wire is threaded. A ball of greater diameter than the aperture is mounted on the end of the wire inside the wedge member.

An actuator is provided in the form of a spindle 32 which is mounted centrally within the fastener assembly for rotation about a transverse actuator axis 34 substantially perpendicularly to the longitudinal axis of the fastener assembly and to the direction of expansion indicated by arrow 26. An outer end 36 of the spindle includes a conventional socket thereon to be engaged to a screwdriver, for example, to rotate the spindle 32 as desired.

A boss 38 mounts the inner end 40 of the spindle for rotation in the assembly. An aperture is provided in the fastener assembly for receiving the outer end 36 of the spindle therethrough to permit access to the socket thereon. In use the outer end 36 of the spindle 32 is aligned with an installation aperture 42 in an outer surface 44 of one of the panels 12 to be joined together as shown in FIG. 1.

The spindle 32 includes a diametric aperture 46 through which the tension member 30 is threaded. In this arrangement, as the spindle 32 is rotated, the tension member 30 is wrapped around the spindle 32 as shown in FIG. 3 for tensioning the tension member and drawing the wedge members 28 inwardly to expand the respective expansible portions 18.

In use two panels 12 are oriented to be mounted together wherein one of the panels includes an installation aperture 42 as shown in FIG. 1. The fastener is inserted into the respective bores 14 such that the actuator axis 34 is aligned with the installation aperture 42 such that the socket on the outer end of the spindle 32 is accessible once the fastener has been inserted into the respective bores.

Rotation of the spindle as shown in FIG. 3 will displace the wedge members from the disengaged position to the engaged position, thus displacing two diametric halves of the respective expansible portion 18 in the direction indicated by arrow 26 along a diameter thereof which lies substantially parallel to the surface of the respective panels 12. The compression force which secures the fastener within the respective bores is thus directed in a plane along the surface of the panel as opposed to expanding the expansible portions in a direction extending transversely to the surfaces of the panels 12 which would result in puckering of the faces of the panels 12 resulting in an undesirable finish when used on furniture and the like.

The use of a flexible tension member allows unlimited travel of the wedges as opposed to the fixed amount of displacement when using a cam actuator. This permits less restrictive tolerances in bore sizes and bore placement when forming panels to be mounted together using the fasteners of the present invention.

Figure 4:
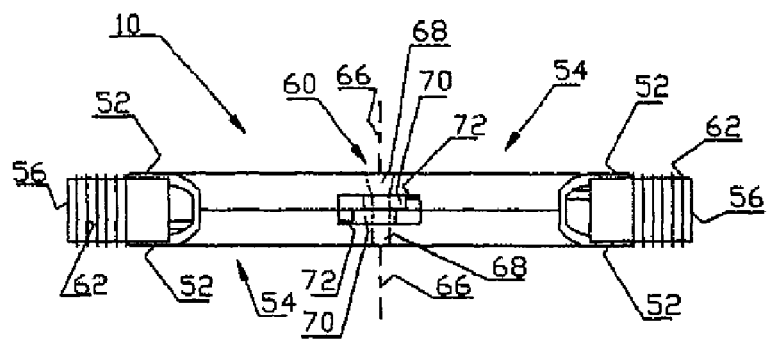
FIG. 4 is a side view of a different embodiment of the fastener according to the present invention shown in a disengaged position.
Figure 5:
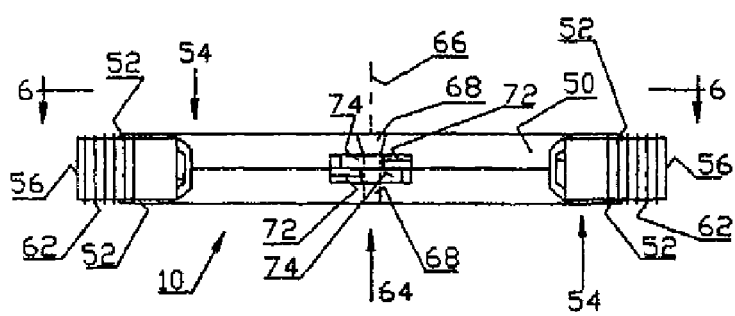
FIG. 5 is a side view of the fastener of FIG. 4 shown in the engaged position.
Figure 6:
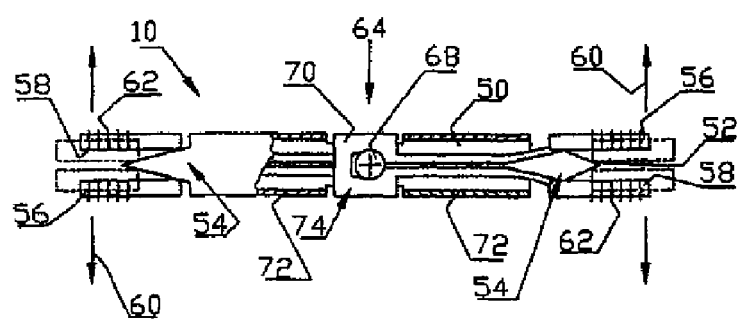
FIG. 6 is a partly sectional view along the line 6—6 of FIG. 5.

In an alternate embodiment as shown in FIGS. 4 through 6 there is provided an elongate tubular housing 50. The housing includes two pointed ends 52 such that the assembled fastener assembly includes a hollow interior having tapered ends defining respective wedge members 54 at respective ends thereof.

A pair of expansible end portions 56 are mounted on the respective ends of the housing for sliding movement relative to the housing and the wedge members 54 which are integrally formed thereon. Each expansible end portion 56 comprises a cylindrical plug formed in two halves by an expansion slot 58 extending axially therethrough. The expansion slots 58 are aligned with the respective apexes of the wedge members 54 such that the wedge members force the two halves of the respective expansible end portions radially outward as the expansible portions 56 are slideably displaced inwardly towards each other from a disengaged position with the wedge members to an engaged position therewith. The expansible end portions are thus expanded primarily in a radial direction indicated by arrow 60. The expansible end portions also include ridges 62 thereon to increase the gripping force of the ends of the fastener within the respective bores similarly to the first embodiment.

An actuator in the form of a spindle 64 is mounted centrally within the housing for rotation about an actuator axis 66 which is perpendicular to the longitudinal axis of the fastener assembly as well the direction indicated by arrow 60. The spindle 64 includes a raised circular protrusion 68 at each end thereof to be received within respective mounting apertures in the housing 50 for rotatably mounting the spindle 64 thereon. The spindle further includes a pair of axially spaced and diametrically opposed cams 70, each associated with a respective expansible end portion 56 for displacing the expansible end portions between the respective disengaged and engaged positions as the spindle 64 is rotated.

A pair of links 72 are coupled between the respective cams 70 and the associated expansible end portions 56. Each link includes an inner end having an opening therein which defines a cam follower 74 receiving a corresponding one of the cams 70 therein. An outer end of each link 72 couples the two halves of the respective expansible end portion thereon at a respective base thereof such that the two halves are resiliently coupled together. The links 72 act as tension members between the expansible end portions and the cams 70 for pulling the expansible end portions over the wedges into the engaged position as shown in FIG. 6 when the cams 70 are rotated. A portion of the opening of each inner end of the links which faces the expansible end portion associated therewith is arranged to engage the corresponding cam 70 wherein the cam has an increasing radial dimension at a point of contact as it is rotated from the disengaged to the engaged positions so as to pull the expansible end portions inward.

In use the fastener is installed into a pair of panels as described with reference to FIG. 1 for producing a tight fitting joint therebetween. In this particular arrangement, as the spindle 64 is rotated by a socket on one end thereof, the expansible end portions are pulled inward towards each other as they are simultaneously expanded for pulling the surfaces 12 to be mounted together towards each other while the expansible end portions are gripped within the respective bores 14 resulting in a particularly secure and tightened joint.

Figure 7:
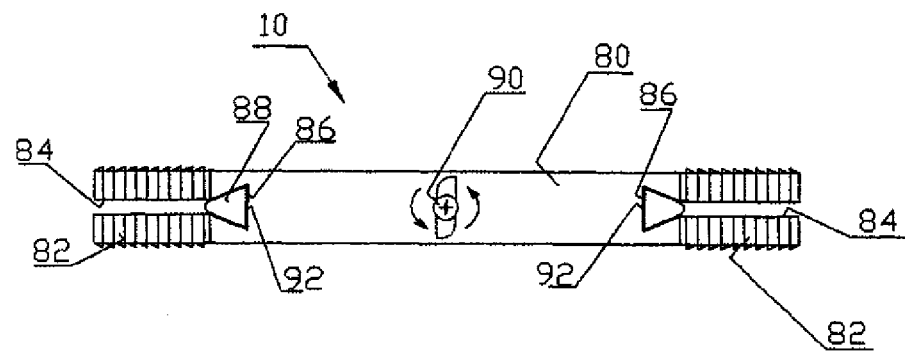
FIG. 7 is a top plan view of a further embodiment of the present invention shown in a disengaged position.
Figure 8:
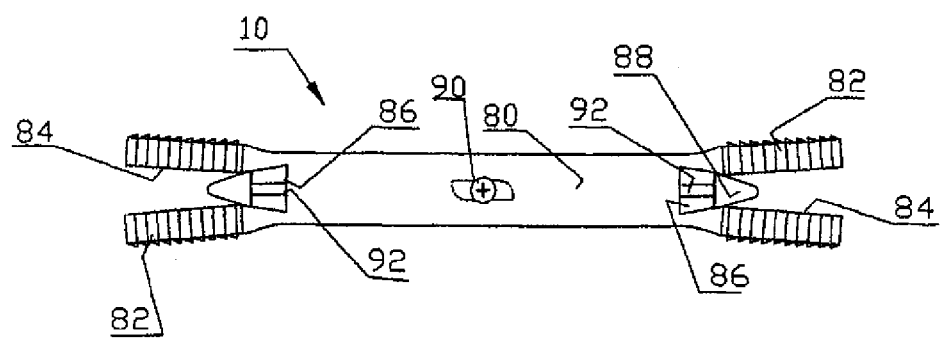
FIG. 8 is a top plan view of the fastener of FIG. 7 shown in an engaged position.

A third embodiment of the present invention is illustrated in FIGS. 7 and 8. An elongate tubular housing 80 is provided having integral expansible end portions 82. Like the previous embodiment, the expansible end portions are formed in two halves separated by a longitudinal expansion slot 84. The two halves of the expansible end portions are resiliently coupled together at their respective inner ends by the housing 80. An inner end 86 of each expansion slot 84 is generally triangular in shape having an outwardly extending apex which tapers towards an outer end of the respective slot. The inner ends 86 of the respective expansion slots 84 are thus arranged to each receive a triangular shaped wedge member 88 therein wherein the wedge members are oriented with outwardly extending apices so as to mate with the inner ends of the respective expansion slots.

An actuator in the form of a spindle 90 is provided similarly to the previous embodiment of FIGS. 4 through 6. A pair of links members 92 are coupled between respective cams on the spindle 90 and the respective wedge members 88 so as to slideably displace the wedge members 88 in a longitudinal direction within the respective expansion slots 84. As the spindle 90 is rotated, the cams thereon engage a portion of an opening in the inner ends of the respective link members 92 which faces away from the wedge member 88 associated therewith. Thus as the cams are rotated the cams push the wedges outwardly from the disengaged position to the engaged position for resiliently deforming the expansible end portions radially outward in a direction substantially perpendicular to an axis of the spindle 90.

In this arrangement rotation of a centrally located actuator acts to expand respective ends of the fastener assembly within respective bores in a pair of mating panels without drawing the expansible end portions inwardly such that the fastener assembly is substantially equal in length in both the engaged and disengaged positions thereof.

Figure 9:
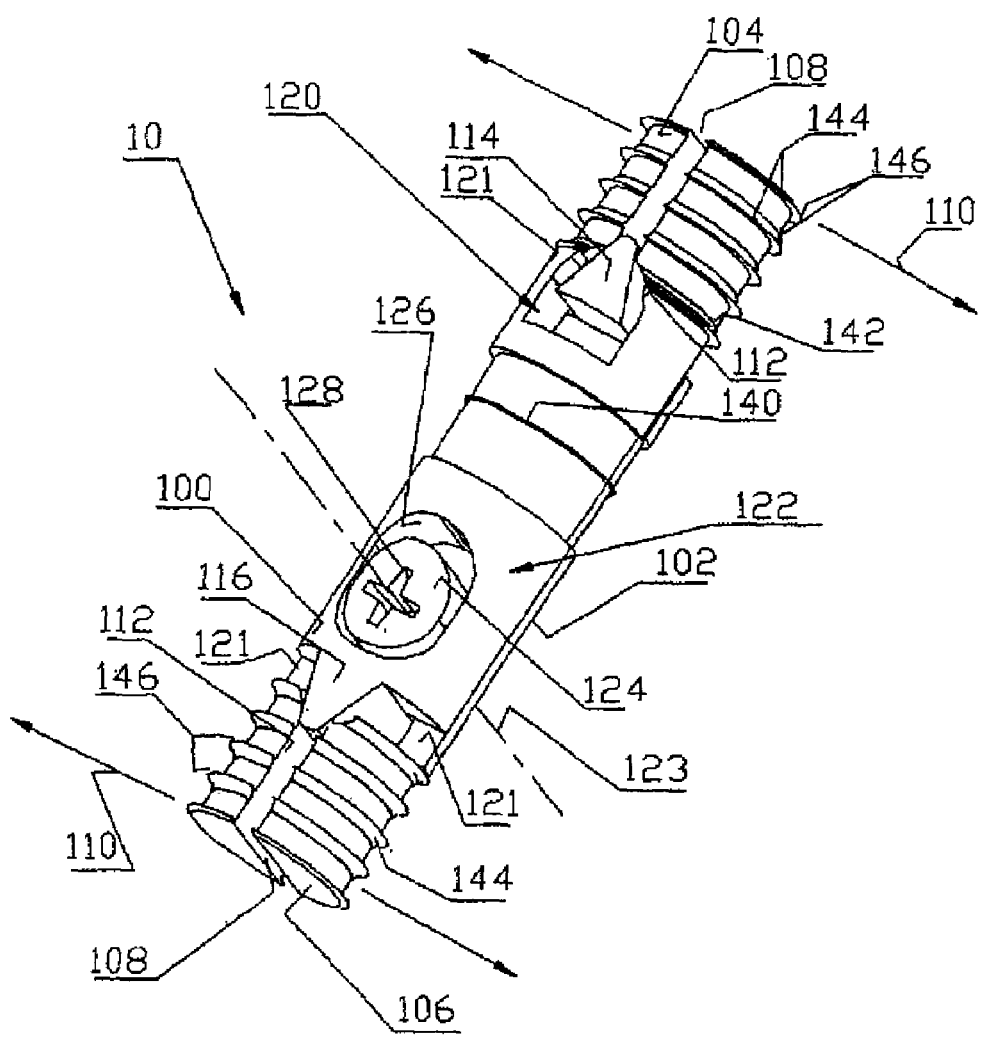
FIG. 9 is an isometric view of yet another embodiment of the present invention.
Figure 10:
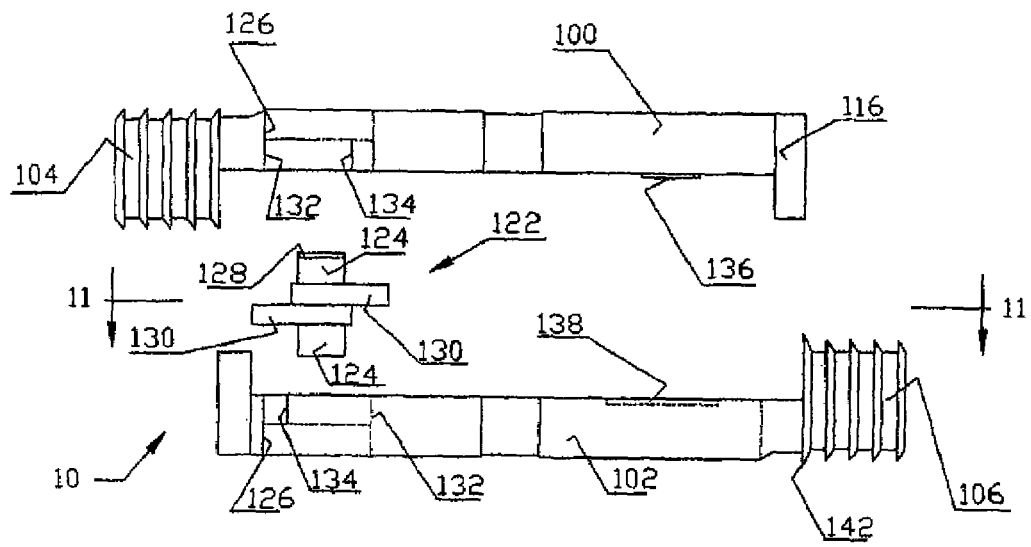
FIG. 10 is an exploded side view of the fastener according to FIG. 9.
Figure 11:
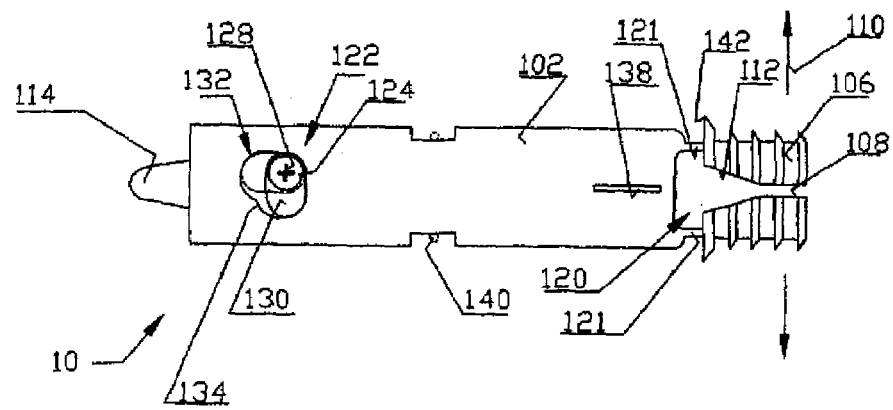
FIG. 11 is a top view along the line 11—11 of FIG. 10.

A further embodiment of the present invention is illustrated in FIGS. 9 through 11 wherein the fastener 10 includes a fastener assembly having first and second longitudinally extending elements 100 and 102 mounted for longitudinal sliding movement with respect to one another. The first and second elements 100 and 102 of the fastener assembly include integral first and second expansible end portions 104 and 106 respectively at opposing ends of the fastener assembly. Each expansible end portion comprises a cylindrical plug having a longitudinally extending expansion slot 108 extending therethrough to permit expansion thereof in a direction indicated by arrow 110.

The inner ends 112 of the expansion slots 108 are triangular in shape having an outwardly extending apex such that each slot 108 is tapered towards an outer end thereof.

First and second wedge members 114 and 116 are positioned adjacent the inner ends of the expansion slots 108 of the respective first and second expansible end portions 104 and 106. Each wedge member 114 and 116 is a bell shaped member which tapers outwardly for mating with the respective inner ends 112 of the respective expansion slots 108. An opening 120 adjacent the inner end 112 of each expansion slot receives the corresponding wedge member therein in a disengaged position which permits the two halves of the expansible end portions to remain in a relaxed position having substantially the same diameter as the assembled cylindrical fastener assembly. Sliding each wedge member longitudinally outward relative to the respective expansible end portion forces the wedge member into the expansion slot 108 thus expanding the expansible end portions radially outward in the direction indicated by arrow 110. A pair of levers 121 are formed integrally within the fastener assembly on each side of the openings 120 for mounting the respective halves of the expansible portions thereon such that an inner end of the lever acts as a pivotal mount when flexed as the expansible portions are expanded. The expansible portions are thus displaced in an arc about the inner end of each lever 121 as they are expanded into the engaged position.

The first wedge member 114 is mounted on an inner end of the second half 102 of the fastener assembly for sliding movement therewith relative to the first half of the fastener assembly 100. Similarly, the second wedge member 116 is mounted on the inner end of the first half 100 of the fastener assembly for sliding movement therewith relative to the second half 102 of the fastener assembly. The wedge members are thus displaced into and out of the respective expansion slots 108 by sliding the two elements of the fastener assembly relative to one another.

An actuator in the form of a spindle 122 is rotatably mounted on the fastener assembly between the ends thereof but offset towards one end for rotation about an actuator axis 123 extending perpendicularly to a longitudinal axis of the fastener assembly as well as being perpendicular to the direction indicated by arrow 110. Raised circular protrusions 124 extend axially from the ends of the spindle 122 to be received in respective ones of two longitudinal slots 126 located in the respective halves of the fastener assembly. The slots 126 permit longitudinal sliding movement therebetween while securing the spindle therein for rotary movement. A socket 128 is located at one end of the spindle.

The spindle 122 carries a pair of axially spaced and diametrically opposed cams 130. Each cam 130 is received within a corresponding recess 132 located in the respective inner face of the respective half of the fastener assembly 100 and 102 associated therewith. Each recess 132 thus defines a cam follower surface for engaging the respective cam 130 associated therewith. The cam profile is arranged to have an increasing radial dimension at a point of contact with the recess 132 as the cam is displaced from the disengaged to the engaged positions for displacing the halves of the fastener assembly relative to one another. Each recess 132 includes a notch 134 in a cam follower surface thereof such that the cam is permitted to rotate past the notch 134 when displaced from the disengaged to the engaged position. Once the cam has been rotated past the corresponding notch 134 however, rotation in the reverse direction from the engage position to the disengage position is restricted by the notch which thus acts as a stop.

A longitudinally extending protrusion 136 is mounted along the inner face of the first element 100 of the fastener assembly and is arranged to be received in a longitudinally extending groove 138 located in an inner face of the second element 102 of the fastener assembly. The groove 138 is longer than the protrusion 136 to permit longitudinal sliding movement therebetween while providing torsional support between the first and second elements of the fastener assembly.

The first and second elements 100 and 102 of the fastener assembly include a central portion of reduced diameter providing a groove receiving an O-ring 140 therein or any other suitable clip for securing the elements together. The O-ring 140 snugly secures the first and second elements of the fastener assembly together while permitting longitudinal sliding movement therebetween. The section of reduced diameter of the fastener assembly permits the O-ring 140 to be recessed below an outer surface of the fastener assembly.

A stop 142 in tie form of an annular flange is located at the inner end of one of the expansible end portions for the purposes of engaging the object in which the fastener is to be mounted and limiting penetration of the end into the bore in the object.

The expansible portions each include a plurality of teeth 144 extending radially outward. The teeth have penetrating free edges 146 at their peripheries such that the fins penetrate into the inner surfaces of the bores when the expansible portions are expanded.

In this arrangement rotation of the spindle 122 causes the cams 130 to engage the cam follower surfaces of the respective recesses 132 to slide the first and second halves 100 and 102 of the fastener assembly longitudinally inward such that the wedge members 114 and 116 are engaged within the respective expansion slots 108 to expand the expansible end portions along a plane perpendicular to the axis of the rotary cam 122 while simultaneously pulling the respective expansible end portions inwards towards each other to provide a force which pulls together a pair of opposing surfaces to be mounted together. The stop 142 assists in initially positioning one of the expansible end portions within the respective bore. Furthermore the penetration of the teeth 144 into the respective bores secures portions of the panel between adjacent teeth as opposed to only frictionally engaging the inner surface of the respective bores receiving the expansible portions therein. The added gripping force ensures the panels are sufficiently drawn together upon assembly of the fastener with the panels.

Figure 12:
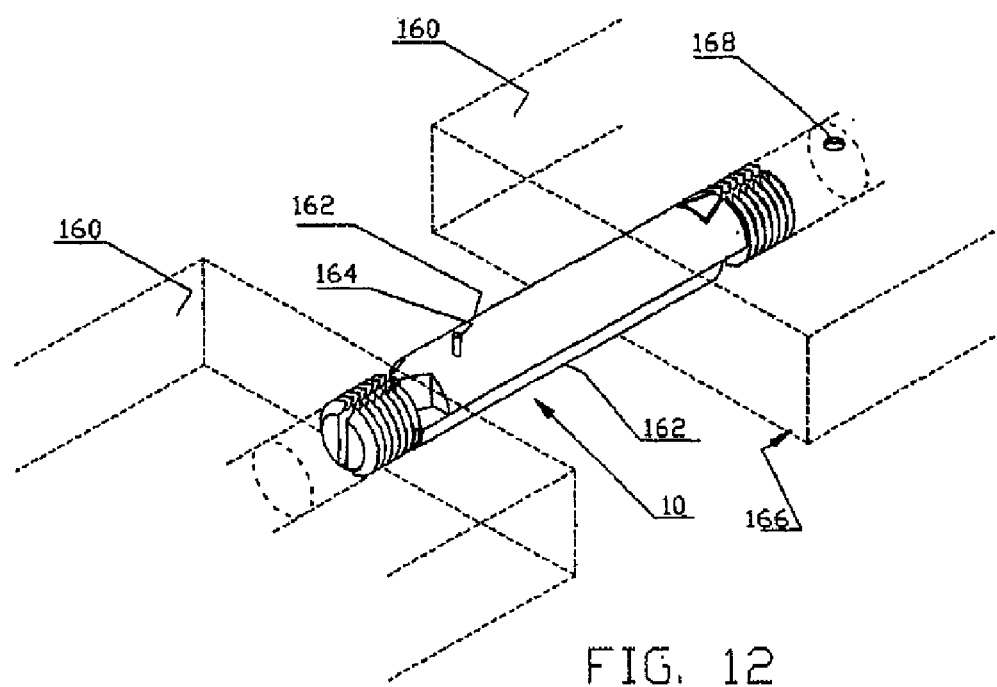
FIG. 12 is an isometric view of a further embodiment of the fastener shown mounting two panels in an edge to edge configuration.

A further embodiment is illustrated in FIG. 12 wherein a pair of edge bored panels 160 are shown being assembled by the fastener 10. The fastener of FIG. 12 includes a fastener assembly having two longitudinal halves 162 similar to the embodiment of FIGS. 9 through 11 wherein there is provided an expansible portion at one end and a wedge member at the other end of each half of the fastener assembly. The halves 162 are longitudinally slideable relative to one another for co-operation of the wedge members with the respective expansible portions as described above.

The actuator in the embodiment of FIG. 12 comprises a catch 164 which extends radially outward from an outer periphery of one half of the fastener assembly. The catch 164 acts as a stop arranged to engage an edge 166 of one of the panels for expanding the expansible portions into the engaged position as the panels are displaced towards one another. The expansible portion opposite the catch bottoms out in the opposing bore such that the expansible portions are displaced into the engaged position as the panels are pushed together.

A release aperture 168 is mounted in one of the panels for alignment with one of the wedge members when the panels are coupled together such that the wedge member may be released from the corresponding expansible end portion by insertion of a tool through the aperture to engage the wedge member. The fastener according to FIG. 12 is thus selectively separable from the panels by using a conventional or screwdriver or the like.

In varying arrangements of the embodiment of FIG. 12 there may be provided a catch on both halves of the fastener assembly or the expansible ends may be arranged to bottom out within the respective bores. In either arrangement the panels engage the halves of the fastener assembly respectively to push them together as the panels are pushed together.

Figure 13:
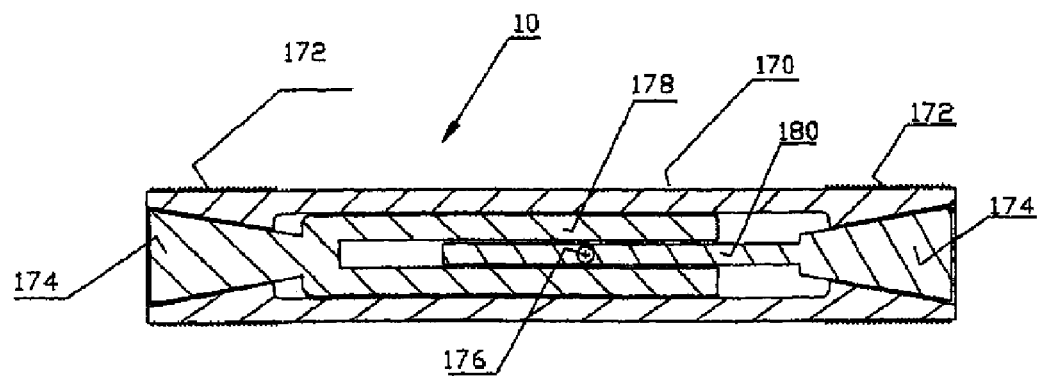
FIG. 13 is a sectional top view of another embodiment of the fastener.

In a further embodiment as illustrated in FIG. 13, the fastener 10 comprises a tubular housing 170 having expansible end portions 172 with respective wedge members 174 mounted therein similar to those described in the first embodiment. An actuator 176 is further provided in the form of a spindle having cams thereon as described above. A pair of link members couple the respective wedge members 174 to the actuator wherein one of the link members comprises a sleeve 178 and the other link member comprises a rod 180 which is arranged to be slideable received within the sleeve 178.

Referring now to variations of the first embodiment shown in FIGS. 1 through 3, the spindle 32 may be a screw which is threaded directly into or through the fastener assembly into the surrounding bore securing the fastener therein. Further arrangements of the pivotal mount 38 are also possible to assist in locking the spindle in place once rotated. This may include a rubber mount, a cam lock, or a ratchet mechanism. The spindle 32 may further be provided with a spring mechanism to urge the socket end thereof outwardly beyond an outer surface of the fastener assembly to assist in alignment with the installation aperture 42 in one of the panels to be mounted. In yet another arrangement the spindle 32 may be free rotating within the fastener assembly or provided with a ratchet or clutch mechanism as well as any other arrangement which would allow one end to expand first or to allow one end to expand more.

The tension member may comprise any band of material suitable for mounting under tension to draw the wedges inwardly while being sufficiently flexible to be wrapped about the spindle. When mounting the tension member on the wedge members it may be preferable to provide a slot along one side of the wedge members for receiving the tension member therethrough for ease of manufacture. Also for ease of manufacture it may be preferable to provide a two part fastener assembly hinged along one longitudinal side thereof for receiving the actuator, the wedge members and the tension member therein. The two part fastener assembly may be molded as one piece wherein the two halves are hinged together by flexing a connecting portion which connects the two halves.

Referring to the embodiment of FIGS. 9 through 11, the actuator may be modified so as to remain in a fixed longitudinal position relative to one of the halves of the fastener assembly such that only one cam 130 is required to engage the other half of the fastener assembly. In this arrangement, one half of the fastener assembly is longitudinally slideable relative to the other half of the fastener assembly in response to rotation of the actuator as similarly described in the embodiment of FIGS. 9 through 11, however the actuator is simpler in design. In either variation of the fastener, the fastener assembly and actuator comprise only three parts which are simple to manufacture and reliable in construction.

Referring generally to either embodiment, further modifications include replacing the actuator with a rack and pinion arrangement wherein the pinion is arranged to rotate about the actuator axis and a pair of racks are provided which are operatively associated with each expansible end portion.

Although it is preferable to make use of a single standardised bore size it may be preferable in some instances to have the diameter of one expansible portion being greater than the other or to have only one end which expands or one end that expands greater than the other. This is particularly useful for on panels which have been manufactured using different standardised bore sizes.

The expansible portions may also be formed such that one is longer in length than the other. Elongating one of the expansible end portions is particularly useful when gripping into a panel formed of lightweight material wherein a greater contact area between the expansible portion and the inner surface of the bore is desired.

When mounting panels in an edge to edge configuration as illustrated in FIG. 12, it may be useful to offset the actuator towards one end of the fastener assembly while providing a stop in the form of an annular flange about the center of the fastener assembly to position the fastener 10 evenly within both of the panels.

Further modifications to the spindle 32 include providing a lock mechanism such as a ratchet mechanism or a material with a coefficient of friction such as a securely fit rubber socket mounting one end of the spindle therein.

For ease of alignment of two opposing bores and for ease of insertion into the bores it may be preferable that an outer diameter of the fastener assembly be substantially equal to an outer diameter of the ridges surrounding the expansible end portions before expansion thereof. The fastener assembly is thus snugly fit within the bore while the expansible portions operate as described above. The use of dowels and glue for alignment of the panels is thus not required.

The outer end of the spindle may include any type of screw head or socket thereon which would permit controlled rotation thereof. For simplicity a conventional screw head is preferable such that only the use of conventional tools is required.

In order to have more control over the expansion of the respective ends of the fastener assembly, two actuators may be provided wherein one actuator is associated with each expansible end portion of the fastener assembly. In this arrangement the fastener may first be inserted into one panel and expanded therein before mounting the second panel on an opposite end of the fastener.

The shape of the wedge members may be generally triangular or bell shaped as well as any other arrangement having a generally diminishing cross section in one longitudinal direction which defines a camming face operatively associated with the expansible end portions and the expansion thereof.

Depending on which particular arrangement or embodiment the fastener comprises, different selections of materials may be appropriate. The materials which form the fastener will generally include zinc castings, steel, plastic or any combination thereof. Any other material which would allow the fastener to function effectively would also be appropriate.

Figure 14:
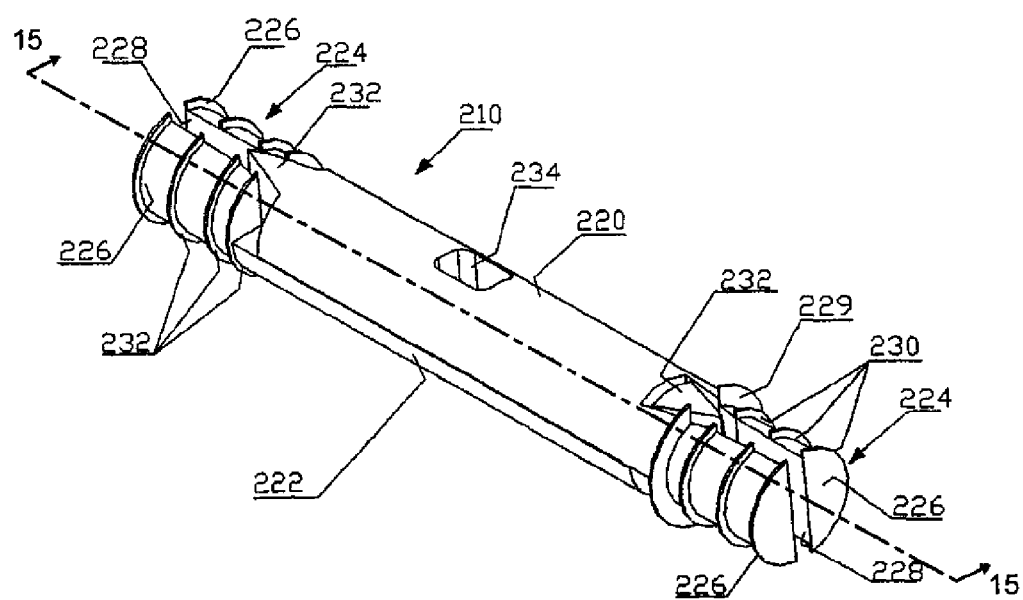
FIG. 14 is an isometric view of another embodiment of the present invention.
Figure 15:
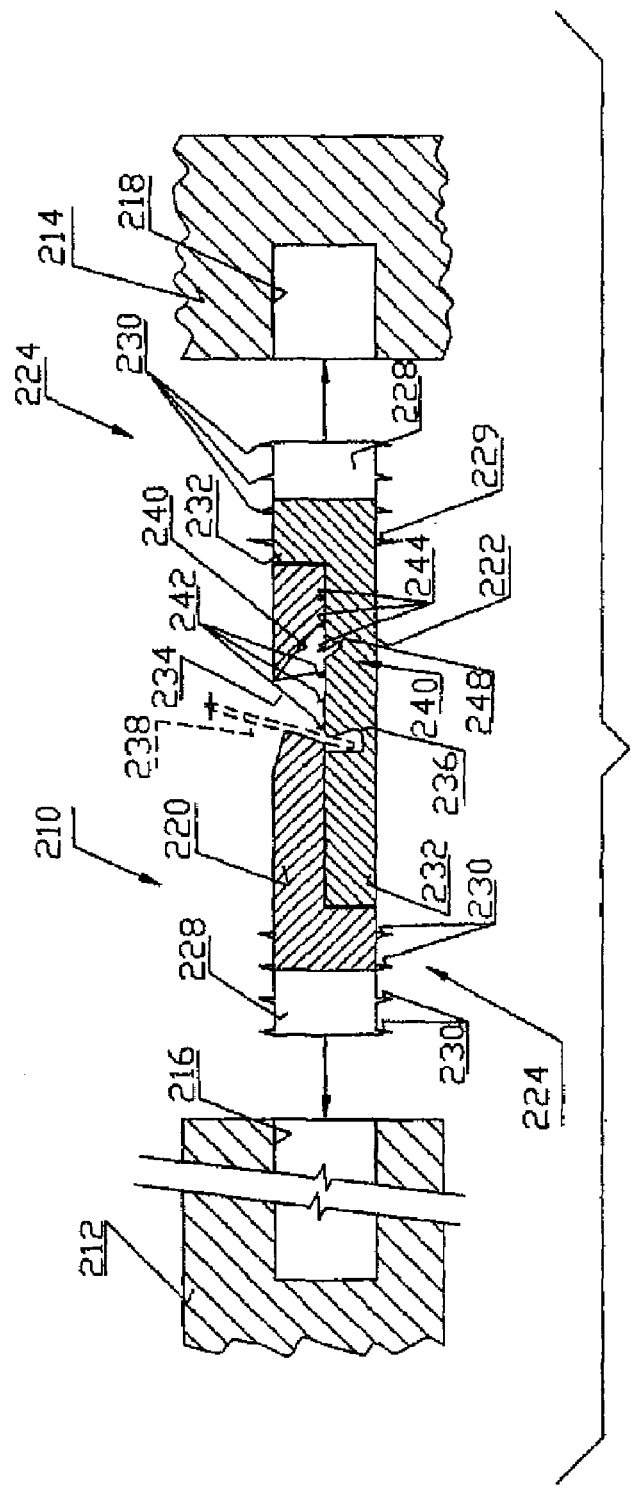
FIG. 15 is a axial cross section of the embodiment of FIG. 14.

Referring once more to the accompanying drawings, and particularly to FIGS. 14 and 15, there is illustrated a fastener 210 for coupling two objects which are illustrated as being two furniture panels 212 and 214. The panels 212 and 214 have respective fastener bores 216 and 218 for receiving the ends of the fastener 210. The fastener is an elongate assembly that includes two elongate elements 220 and 222 arranged side by side.The assembly has two expandable ends 224 that are portions of the respective elements 220 and 222. Each end is separated into two segments 26 by a diametral slot 228 extending longitudinally through the end. Spaced along the assembly from the end 224 of element 220 is a radially extending stop 229 that limits penetration of the fastener into the fastener receiving bore 218 as will be discussed more fully in the following. Each end 224 of the assembly has a set of annular teeth 230. Each of the elements 220 and 222 includes a wedge 232 that confronts the slot 228 in the end 224 of the other element.

The element 220 has a transverse through aperture 234 between the wedge 232 and the end 224. This aperture confronts a cavity 236 in the element 222. To displace the elements 220 and 222 relative to one another a lever 238, which may conveniently be in the form of a flat blade screwdriver, is inserted through the aperture 234 into the cavity 236 and is then pivoted to provide a prying action on the two elements, driving the wedges 232 into the slots 228 to expand the ends of the fastener assembly. At the same time, this draws the ends of the assembly together so that objects engaged by those ends will be drawn together.

To hold the elements 220 and 222 in the engaged position, with the ends expanded, the fastener includes a retainer 240. This includes a set of projections, shaped as inclined teeth 242 on the elements 220 and a set of mating recesses 244 on the confronting face of element 222. When the two elements are displaced to the engaged position, the teeth 242 are cammed into the recesses 244 by their inclined leading faces and are retained in place by their engagement with the recesses. In order that the fastener may be disengaged, an unlock opening 246 is formed in the elements 220, in the centre of the teeth and communicating with the aperture 234. A confronting groove 248 is formed in the element 222 so that the lever 238 can be inserted into the aperture 234 and opening 246 to engage the groove 248, so that the two elements can be pried apart when necessary.

Figure 16:
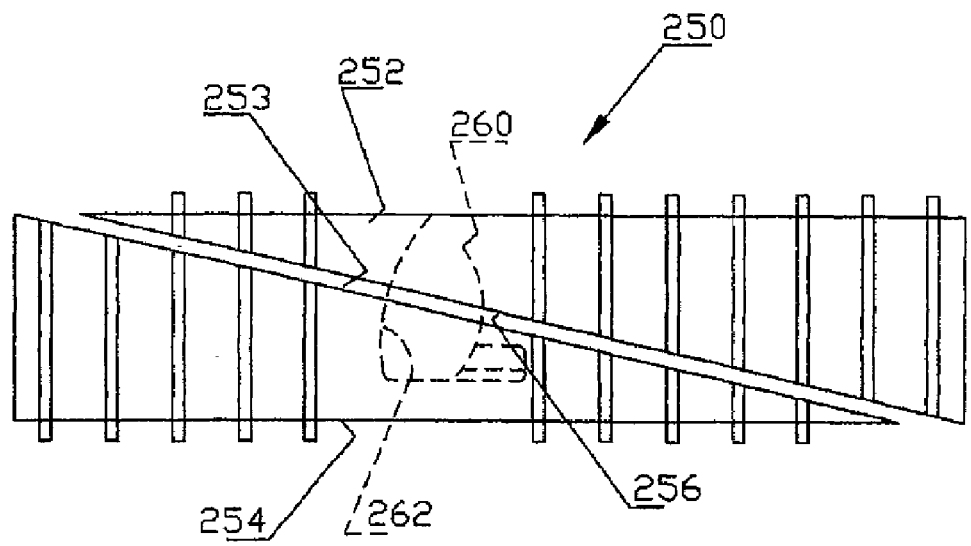
FIG. 16 is a side elevation of a further embodiment of the present invention.

FIG. 16 illustrates an alternative embodiment of the present invention where the fastener 250 includes two elements 252 and 254 with mating faces 256 and 258 inclined to the longitudinal extent of the fastener. Element 252 has a transverse through aperture 60 and element 254 a confronting cavity 262 that are used in conjunction with a lever to displace the two elements longitudinally relative to one another, with the two inclined faces sliding along one another to expand the transverse dimension of the fastener as the elements move from the disengaged to the engaged position. This embodiment incorporates the retainer mechanism of FIG. 15 for preventing the elements from returning inadvertently from the engaged to the disengaged position.

Figure 17:
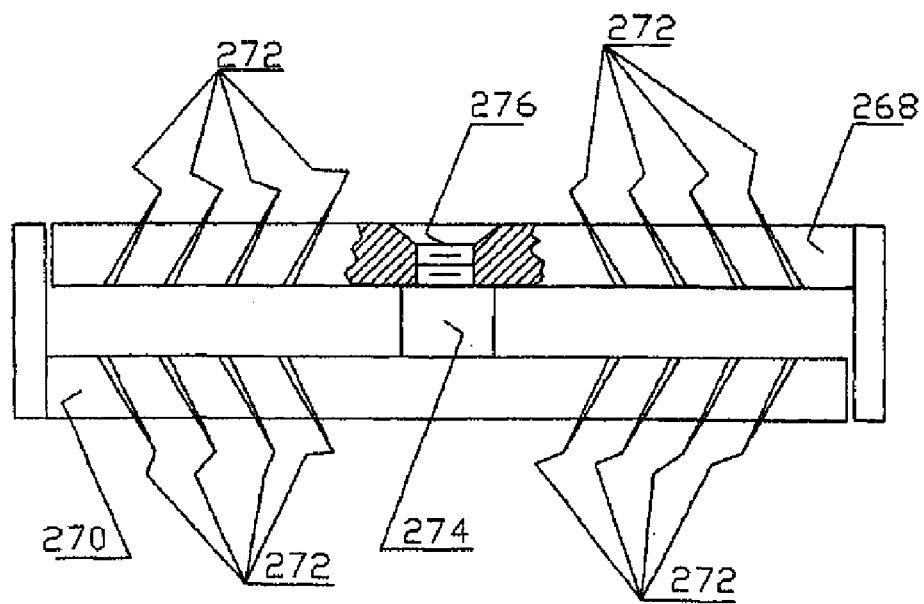
FIG. 17 is a aide view of another embodiment of the present invention.

A further embodiment of the present invention is illustrated in FIG. 17. In that a embodiment, the fastener 266 has two elements 68 and 270 parallel to one another. Each element has a set of teeth 272 on each of its ends. A spacer 274 is connected to element 270 and is engaged by a screw 276 threaded into a mating bore in element 268. Rotation of the screw 276 displaces the elements 268 and 270 transversely with respect to one another to enlarge or contract the ends for engaging or releasing the bores in which they are seated.

Figure 18:
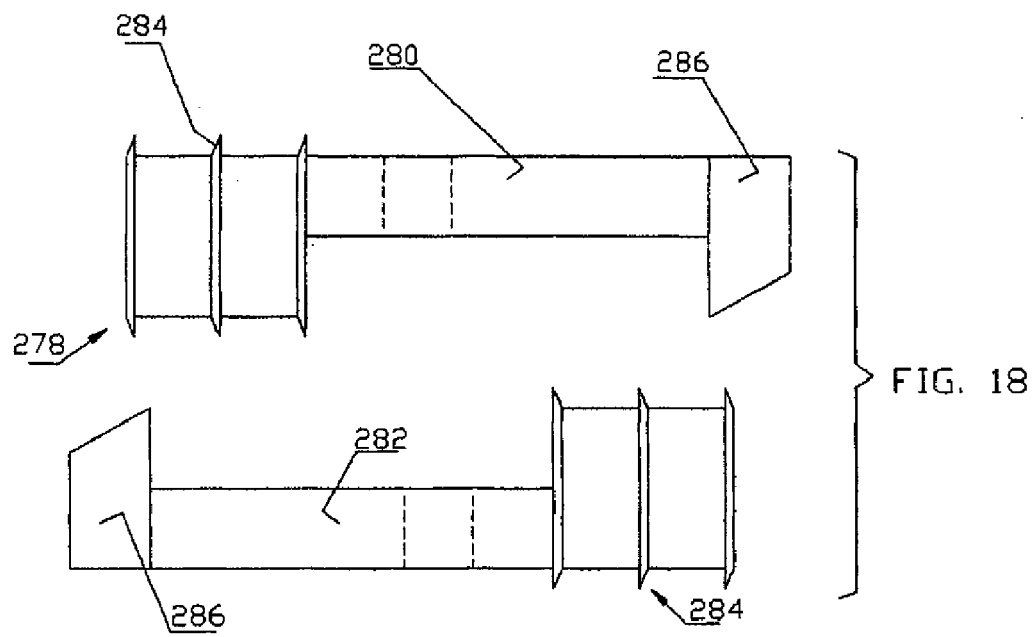
FIG. 18 is a exploded view of another embodiment of the present invention.
Figure 19:
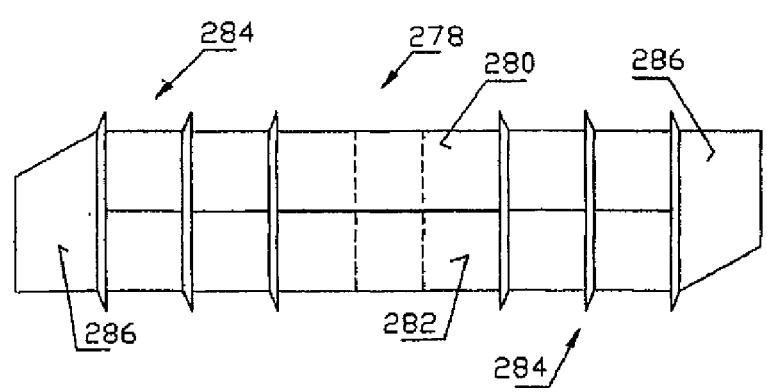
FIG. 19 is a side view of the embodiment of FIG. 18.

A further embodiment of the fastener as illustrated in FIGS. 18 and 19, were the fastener 278 includes two elements 280 and 282, each with a diametrically split, toothed end 284 and a wedge 286 at the opposite end which faces towards the end 24. In this embodiment, the wedges work in the opposite direction from those of the embodiment illustrated in FIG. 14, in that they expand the ends of the fastener assembly from the ends of the assembly towards the centre.

Figure 20:
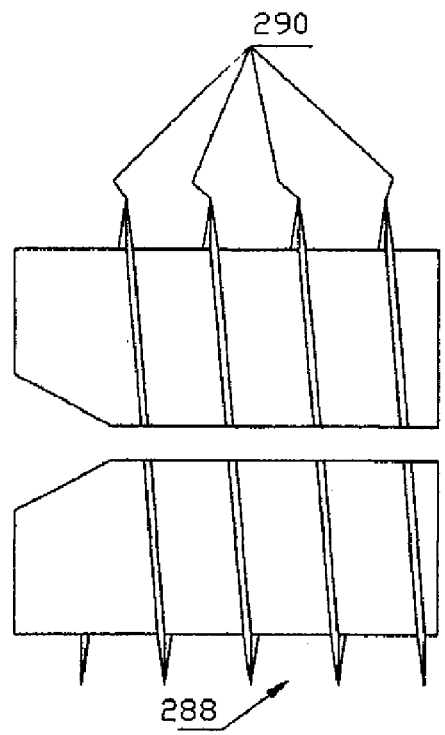
FIG. 20 is a side view of a fastener assembly end with helical teeth.

FIG. 20 illustrates an expansible end for use on one of the elements of a fastener like that illustrated in FIG. 14. In this case, the end 288 has helical teeth 290 which allow the end to be screwed into an object to which the fastener is to be connected.

Figure 21:
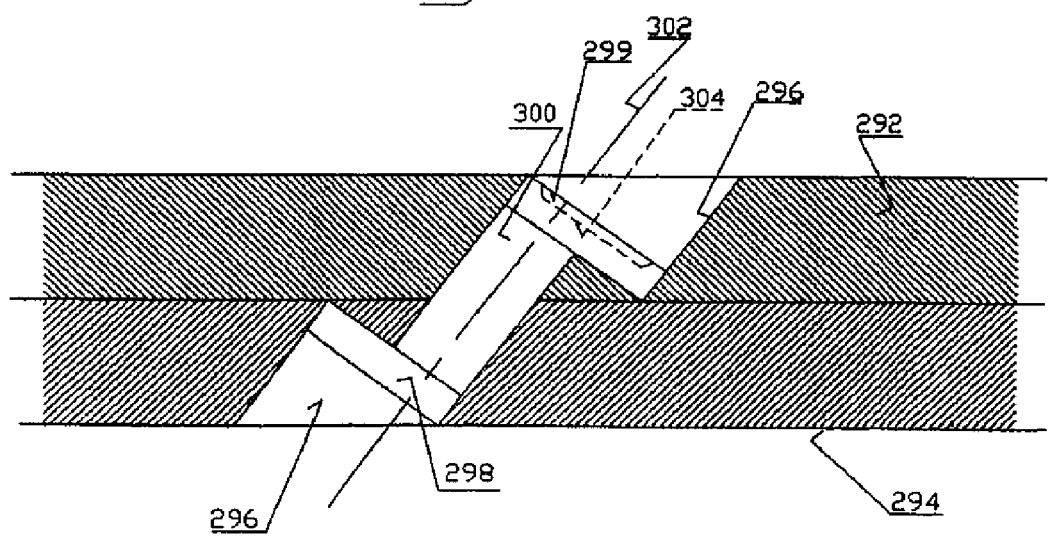
FIG. 21 is a partial cross section of a fastener assembly including an inclined cam actuator.

FIG. 21 illustrates a cam mechanism for use in displacing the two elements 292 and 294 of a fastener between the engaged and disengaged positions and for retaining the elements in the engaged position. As illustrated each element has an inclined bore 296 for receiving a cam 298. These cams are joined by a shaft 300. The cams and the shaft are rotatable about an inclined axis 302 using a screwdriver engaged in an appropriate screwdriver engaging formation 304 in the end of one of the cams 298. This arrangement makes it convenient to place the actuator cam closer to the intersection between two objects than would otherwise be the case, that the screwdriver will be inclined away from the juncture of the two parts to be joined.

Figure 22:
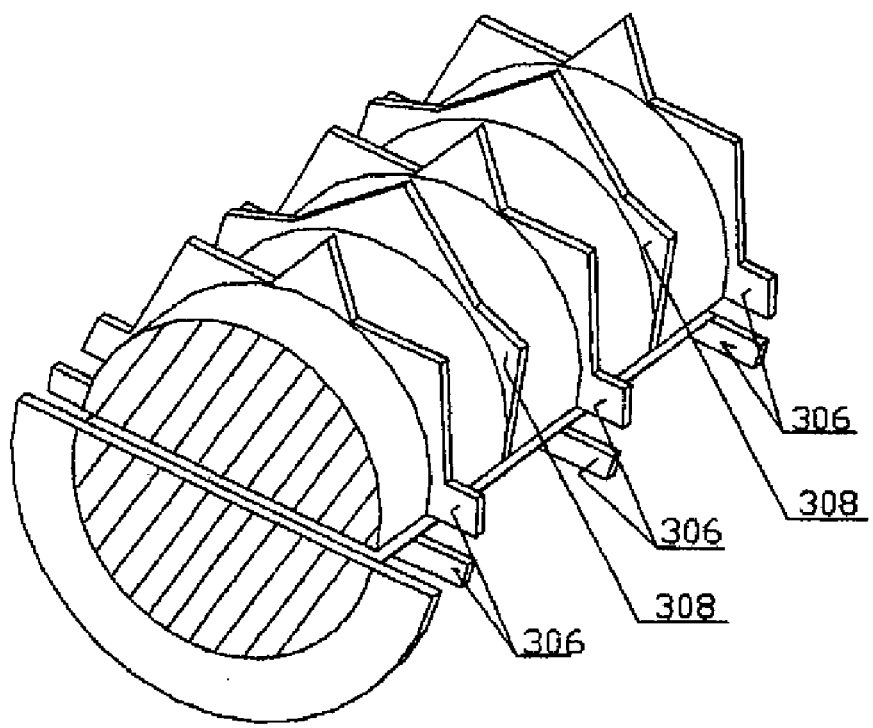
FIG. 22 is an isometric view of a fastener assembly end showing certain tooth configurations.
Figure 23:
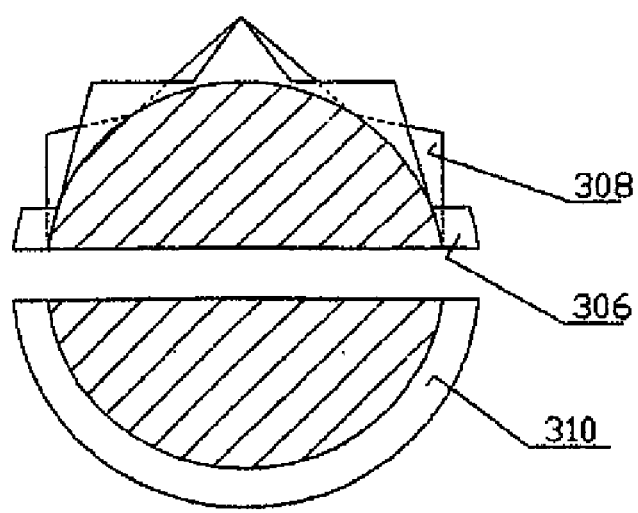
FIG. 23 is a cross section along line 23—23 of FIG. 22.

FIGS. 22 and 23 illustrate an alternative form of the teeth used on the ends of the fasteners. As shown, two different tooth configurations, 306 and 308 teeth are spaced along the end of the fastener and have different profiles providing projecting, triangular teeth to penetrate the surface of the bore when the fastener has expanded. As illustrated the stop 310 is larger than the teeth in its radial extent so as to engage the face of the object to limit penetration of the fastener into the bore.

Figure 24:
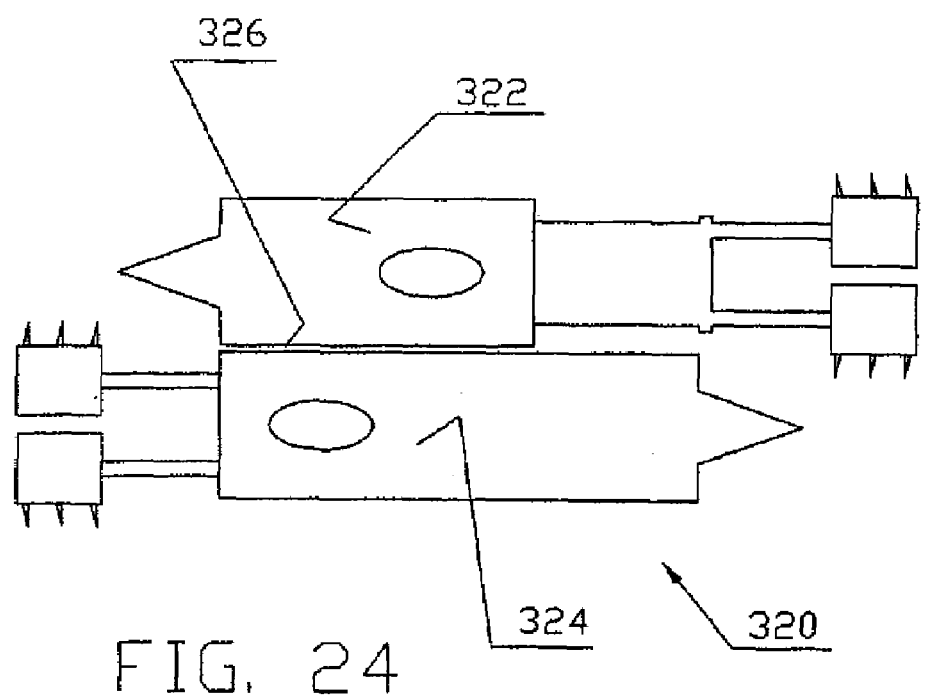
FIG. 24 is a plan view of a one piece molding for use in a fastener assembly.

FIG. 24 illustrates a fastener assembly moulded as one piece. As illustrated, the assembly 320 includes two elements 322 and 324 joined by a thin, frangible hinge 326 of plastic material. In use, the two elements are folded together along the hinge and separated when the two elements are moved relative to one another two the engaged position.

Figure 25:
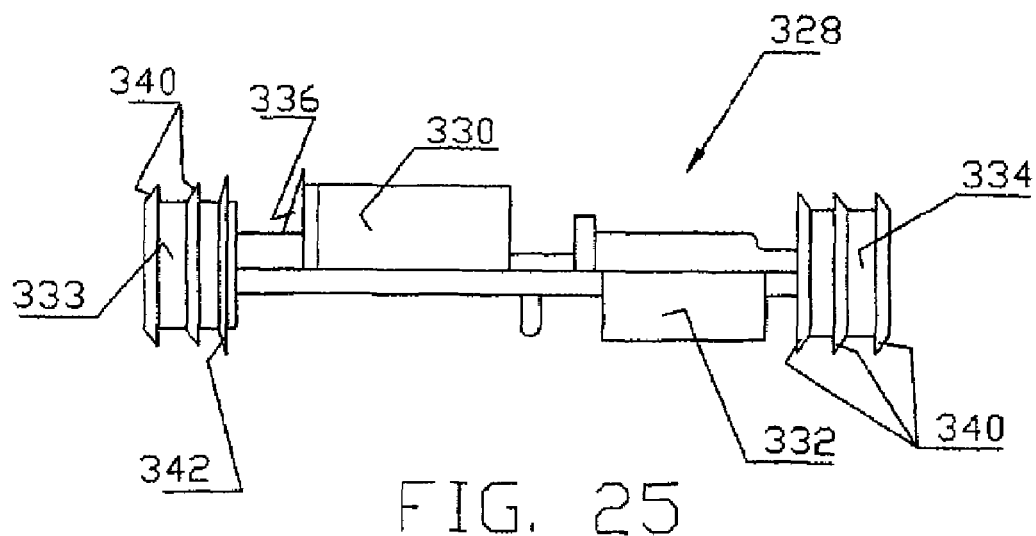
FIG. 25 is a plan view of an embodiment that can be installed without tools.

FIG. 25 illustrates, like FIG. 12, an embodiment of the fastener that can be installed without tools. In this embodiment, the fastener assembly 328 has two elements 330 and 332. Element 330 has an expandable end portion 334 at one end and a radially extending stop 336 at the other. The stop is shaped as an axially extending blade to cut into the face of an object that it engages. The element 332 has an expandable end 338. Both expandable ends carry peripheral teeth 340. An actuator 342 is mounted on the expandable end 338, adjacent the inner end. This is a radial stop that engages the surface of an object into which the expandable end portion 338 is inserted, to limit the depth of insertion. This positioning of the stop or actuator may conveniently be used where the bore is on the face of a relatively thin panel, although it is not limited to use in that environment.

In other embodiments similar to that illustrated in FIG. 25, the actuator 342 may be omitted, and the stop 336 replaced with a flat stop that also serves as an actuator.

While particular embodiments of the present invention have been described in the foregoing, it is to be understood that the invention is not limited to those embodiments. Other embodiments within the scope of the invention are possible. For example, the configuration of the actuators may vary widely, whether configured as cams, stops, screws or some other mechanism. Cam designs are particularly variable and may be one-lobed or two lobed, depending on whether one or both ends of the fastener are to move relative to the objects being joined in moving from the disengaged position to the engaged position. Stops, both for limiting the depth of penetration and for use as actuators may have various forms, depending on any secondary functions they may have, e.g. anti-rotation, and the nature of the material being joined. Wedges may also have different configurations. They may, for example be round in some instances to reduce friction. As will be evident to those knowledgeable in the in the art, numerous other modifications are possible within the scope of the invention. All such embodiments incorporating such modifications are intended to be included within the scope of the present invention. The invention is to be considered limited solely by the appended claims.

The invention claimed is:

1. A fastener for coupling two objects with respective fastener receiving bores therein, the fastener comprising an elongate fastener assembly having an axis in the elongate direction and with opposite ends for insertion into the respective bores in the two objects, the assembly including:
   separate first and second elongate elements positioned side by side and relatively movable between a disengaged position and an engaged position in which both ends of the fastener assembly are expanded transversely to engage the respective bores; and
   a retainer for retaining the first and second elements in the engaged position;
   wherein when the fastener element is in the disengaged position, linear motion along the elongate axis alone, of the first elongate element relative to the second elongate element causes both ends of the fastener assembly to expand transversely to the engaged position.

2. A fastener according to claim 1 wherein the first and second elements are longitudinally tapered and are longitudinally displaced relative to one another in movement between the disengaged and engaged positions.

3. A fastener according to claim 1 wherein the first element includes a transverse through aperture and the second element includes a cavity confronting the aperture whereby a lever may be inserted through the aperture to engage the cavity for displacing the first and second elements between the engaged and disengaged positions.

4. A fastener according to claim 3 wherein the retainer comprises at least one projection on one of the first and second elements and a recess in the other of the first and second elements for receiving the projection in the engaged position.

5. A fastener according to claim 1 including an actuator for moving the first and second elements transversely with respect to one another for movement between the disengaged and engaged positions.

6. A fastener according to claim 5 wherein the actuator comprises an actuator member extending transversely between the first and second elements and rotatable about a transverse axis to vary the spacing of the first and second elements.

7. A fastener according to claim 6 wherein the retainer comprises the actuator member.

8. A fastener according to claim 7 wherein the actuator member comprises a transverse threaded number and a mating thread on one of the first and second elements.

9. A fastener according to claim 1 wherein one of the ends of the fastener assembly is larger in transverse size than the other.

10. A fastener according to claim 1 wherein each end comprises teeth on the periphery thereof, and wherein the teeth are helically oriented ribs, extending outwards from the end and wherein the first and second elements being movable longitudinally relative to one another between a disengaged position with the ends spaced apart by a first distance and an engaged position with the ends spaced apart by a second distance, less than the first distance, and the first and second elements including respective means responsive to movement of the first and second elements to the engaged position for transversely expanding the second and first ends respectively to engage the respective bore.

11. A fastener according to claim 1, wherein the first and second elements being movable longitudinally relative to one another between a disengaged position with the expandable ends spaced apart by a first distance and an engaged position with the expandable ends spaced apart by a second distance, less than the first distance, and the first and second elements including respective means responsive to movement of the first and second elements to the engaged position for transversely expanding the second and first expandable ends respectively to engage the respective bores; and
  a stop on the first element for engaging one of the objects to limit the depth of insertion of the first expandable end into the respective bore.

12. A fastener according to claim 11 including a stop on the second element for engaging the other of the objects to limit the depth of insertion of the second expandable end into the respective bore.

13. A fastener according to claim 12 wherein at least one of the stops comprises an actuator for moving the first and second elements from the disengaged position to the engaged position in response to movement of the objects towards one another.

14. A fastener according to claim 11 including an actuator for moving the first and second elements from the disengaged position to the engaged position.

15. A fastener according to claim 1 wherein the actuator axis is inclined at an angle less than 90° to the elongate fastener assembly.

16. A method of joining two objects with respective fastener receiving bores therein, the method comprising:
  providing the elongate fastener assembly of claim 1;
  inserting the opposite ends of the fastener assembly into the respective bores; and
  displacing the first and second fastener elements relative to one another in a linear motion along the elongate axis to expand the ends of the fastener assembly thereby griping the bores.

* * * * *